(12) United States Patent
    Schildt et al.

(10) Patent No.: US 10,203,952 B2
(45) Date of Patent: Feb. 12, 2019

(54) TRANSPARENTLY SPLITTING AND REWRITING DATA-BASE OBJECT BUNDLES TO DATABASE ENTITIES

(71) Applicant: SAP SE, Walldorf (DE)

(72) Inventors: Christopher Schildt, Walldorf (DE); Cornelia Kinder, Walldorf (DE); Alexander Bunte, Walldorf (DE)

(73) Assignee: SAP SE, Walldorf (DE)

( * ) Notice: Subject to any disclaimer, the term of this patent is extended or adjusted under 35 U.S.C. 154(b) by 519 days.

(21) Appl. No.: 14/945,393

(22) Filed: Nov. 18, 2015

(65) Prior Publication Data

US 2017/0139999 A1    May 18, 2017

(51) Int. Cl.
    *G06F 17/30*    (2006.01)
    *G06F 8/71*    (2018.01)

(52) U.S. Cl.
    CPC ..................... *G06F 8/71* (2013.01)

(58) Field of Classification Search
    CPC ....................................................... G06F 8/71
    See application file for complete search history.

(56) References Cited

U.S. PATENT DOCUMENTS

| | | | |
|---|---|---|---|
| 5,926,652 A | 7/1999 | Reznak | |
| 6,473,763 B1 | 10/2002 | Corl, Jr. et al. | |
| 6,594,655 B2 | 7/2003 | Tal et al. | |
| 6,694,482 B1 | 2/2004 | Arellano et al. | |
| 9,323,644 B1 * | 4/2016 | Hale | G06F 8/433 |
| 2001/0049682 A1 * | 12/2001 | Vincent | G06F 17/30595 |
| 2005/0039036 A1 | 2/2005 | Eisen | |
| 2009/0193046 A1 | 7/2009 | Desai et al. | |
| 2010/0169289 A1 | 7/2010 | Newport et al. | |
| 2010/0169863 A1 * | 7/2010 | Adams | G06F 9/44521 717/120 |

* cited by examiner

*Primary Examiner* — Jared M Bibbee
(74) *Attorney, Agent, or Firm* — Mintz, Levin, Cohn, Ferris, Glovsky and Popeo, P.C.

(57) ABSTRACT

The current subject matter relates to an approach for splitting and rewriting database object bundles into database entities or subunits. For example, cyclical dependencies between a first parameter file and a second parameter file can be identified. The first parameter file can be partitioned into a plurality of subunits comprising a first subunit and a second subunit. The second parameter file, the first subunit, and the second subunit can be reordered to a call order that ensures there are no cyclical dependencies.

18 Claims, 5 Drawing Sheets

TRANSPARENTLY SPLITTING AND REWRITING DATA-BASE OBJECT BUNDLES TO DATABASE ENTITIES

TECHNICAL FIELD

The subject matter described herein relates to splitting and rewriting database object bundles to database entities, for example to avoid or minimize errors caused by cyclic dependencies.

BACKGROUND

A database deployment infrastructure can be a service layer of a database management system that simplifies the deployment of database objects and other design time artifacts by providing a declarative approach for defining these design time artifacts and ensuring a consistent deployment into the database management system environment (DBMS), based on a transactional all-or-nothing deployment model and implicit dependency management. Such an approach can leverage capabilities of a modern high-speed DBMS, such as for example the HANA in-memory DBMS available from SAP SE of Walldorf, Germany, which can provide very high performance relative to disk-based approaches.

Additionally, using various customization-enabling integrated development environments (IDE), such as for example the HANA Studio available for use with the HANA IM-DBMS, a user may create information models, tables, landscapes, etc. on a different system or systems than that on which a DBMS is executed. Transport of data from the database to the other systems can be accomplished using a design time table import (DTTI) object rather than requiring recreation of an entire table or set of tables in the target system.

Furthermore, organization of database artifacts during development can be driven by semantic properties instead of technical reasons. For example, configuration files can include one file that describes several parameters instead of having several files that each describes a single parameter. However, these various parameters may not be ordered in a single parameter file in a manner that enables all of the dependencies between the design time artifacts to be properly resolved at run time. In other words, one or more cyclic dependencies can be created. As used herein, cyclic dependencies refer to situations in which a design time artifact that requires the result of another action (e.g. a call to another design time artifact, loading of data into a table, creation of a view, or the like) is called before the result is completed.

SUMMARY

Aspects of the current subject matter can include splitting and rewriting database object bundles to database entities to correct cyclic dependencies.

In one aspect, a method includes identifying a cyclical dependency between a first parameter file and a second parameter file. The first parameter file including a first call to a first artifact and a second call to a second artifact. The second parameter file including a third call to a third artifact. The method further including partitioning the first parameter file into a plurality of subunits including a first subunit having the first call and a second subunit having the second call. The method further including reordering the second parameter file, the first subunit, and the second subunit to a call order that ensures the first subunit is executed prior to the second parameter file and the second file is executed prior to the second subunit The method further including executing the second file, the first subunit, and the second subunit according to the call order.

In optional variations, one or more of the following features can be included in any feasible combination. The method can further include assigning metadata to each of the first subunit and the second subunit, the metadata including information that links each of the first subunit and the second subunit to the first file. The cyclical dependency can include a requirement that the first call is executed prior to the third call being executed and that the second call is executed after the third call is executed. The operations can further include maintaining a catalog relation between runtime and design time artifacts to point to the first parameter file and not to the first subunit and/or the second subunit. The operations cab further include partitioning the second parameter file into a second plurality of subunits including a third subunit having the third call and a fourth subunit having a fourth call to a fourth artifact that the second parameter file further includes.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
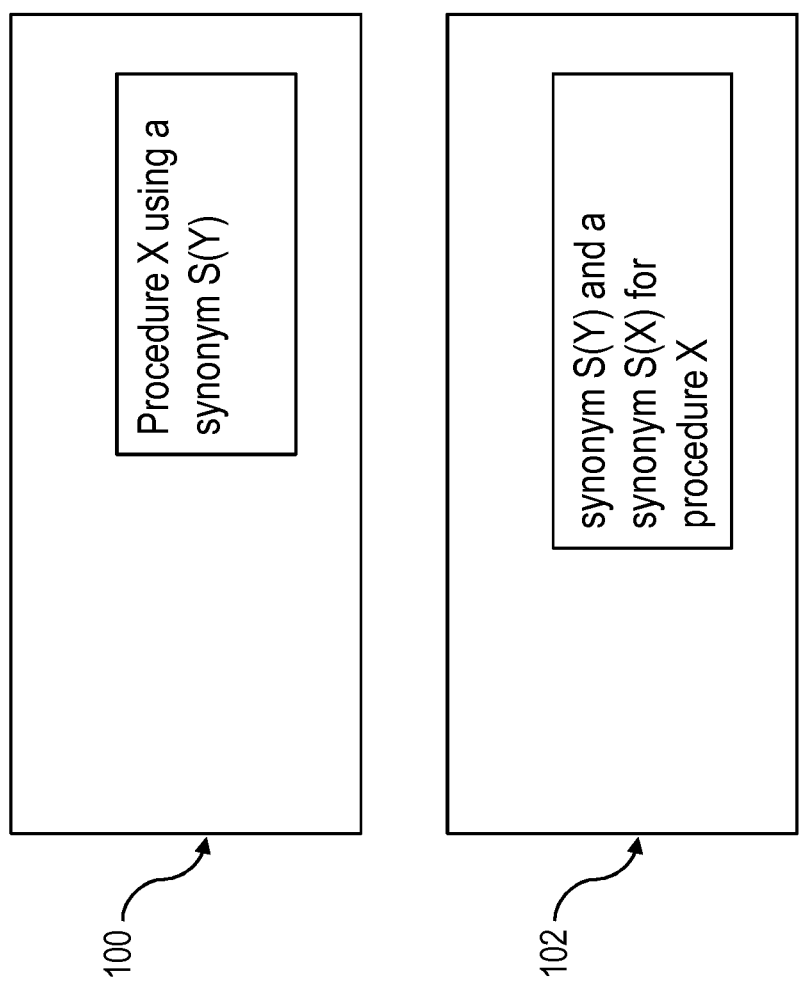
FIG. 1 shows a diagram illustrating a first file that contains a procedure X using a synonym S(Y) and a second file that contains a synonym definition S(Y) and a synonym definition S(X) for procedure X.

The current subject matter relates to an approach for splitting and rewriting database object bundles into database entities or subunits. The organization of database artifacts (i.e., development sources) during development of an application such as a database application can be driven by semantic properties, such as instead of technical reasons. For example, an IDE or other interface for creating an application may collect and organize calls to a number of design time artifacts in a manner that is clear and understandable to a human user of the interface or IDE.

A simplified example of a situation in which implementations of the current subject matter may be advantageously applied involves a table (e.g. a database object in a physical layer of the database), a view generated on top of the table via one or more SQL statements, and a sequence (e.g. generated via one or more SQL statements or by a call from a higher level programming language in an application layer, via a semantic call from a calculation engine layer, or the like) that makes use of the view. In this example, the sequence requires the view for proper execution and the view requires the table. However, a single parameter file created according to a high-level programming language and then translated into a database language, such as SQL or the like, may not have sufficient visibility into the dependencies in the various design time artifacts and necessary run time actions to enable the application to execute properly at run time.

It can advantageous to sub-divide a large parameter file into multiple sub-files of subunits (as they are referred to herein), for example with a subunit for each configuration parameter (or alternatively with a subunit containing some atomic grouping of parameters that should be executed as a single unit). Consistent with implementations of the current subject matter, large parameter files can be processed and transparently broken down into smaller valid subunits. For example, a valid sub-file or subunit can be represented in the same format that was used to create the original file, which can allow the subunit to be deployable from a user side. Such subunits can then be processed as normal, thereby breaking up cyclic dependencies. Resultant outputs (e.g., error reporting) can be retranslated to match the original file, which can allow for keeping up with the transparency. As used herein, transparency can include processing or executing the subunits such that the division of a larger input file into subunits is undetectable, for example to a user, by another artifact, etc. For example, all messages and/or data can be directed back to the original larger parameter file (and not a subunit). In some implementations, for example, transparency can be accomplished by having catalog relations between runtime and design time artifacts pointing to the original larger parameter file and not a subunit. As such, artifacts that have dependencies to one or more subunits will not have any knowledge that the splitting of the original larger parameter file was even done.

A cyclical dependency can arise, for example, when a file requires something to occur (e.g., data produced, a table formed, etc.) prior to being executed. As an example, a first file can have a first call having a first artifact and a second call having a second artifact. A second file can have a third call having a third artifact. The third call can require the first call to be executed prior to executing the third call (such as due to the third artifact being dependent on first artifact, which could be a table or the like) while the second call can require the third artifact present prior to execution of the second call. As such, there is no viable order in which the first and second files can be called to avoid occurrence of a cyclical dependency. For example, if the first file is called before the second file, the second artifact will be called prior to the third call, such that the third artifact will not be present. Alternatively, if the second file is called before the first file, the third call to the third artifact will occur before the first call is made. Either ordering of the first and second files causes an error to result.

Consistent with implementations of the current subject matter, to avoid a cyclical dependency, the first file can be broken into two subunits, with a first submit including the first call and a second subunit including the second call. In this manner, the first call can be ordered before the third call, which can ensure that the third call (of the second file) is not executed prior to executing the first subunit (having the first call from the first file). Furthermore, the second call can be executed after the third call. As such, the second subunit (having the second call) can be ordered after the second file (having the third call) to ensure that the third call is executed prior to executing the second call. Thus, splitting files into subunits and reordering then relative to each other and other files can prevent cyclical dependencies.

In some implementations, when a parameter file is split into smaller subunits, metadata can be added to each of the subunits. Such metadata can include a variety of information, such as information that can identify a parameter file from which the subunit originated (e.g. prior to being split off into the smaller subunit). This information can allow for the tracking of subunits relative to either other subunits split out from the same parameter file or the remaining part of the parameter file from which the subunit came from. As such, metadata of subunits can be evaluated for determining where a subunit came from and which other subunits the subunit is associated with. This feature of the current subject matter can assist with allowing processing and execution of the subunits in a transparent manner.

FIG. 1 illustrates an example illustrating features of an approach consistent with implementations of the current subject matter. A first file 100 contains a procedure X using a synonym S(Y). In addition, a second file 102 contains a synonym S(Y) and a synonym S(X) for procedure X. This organization can make sense from a user point of view, for example because the configurable artifacts (S(Y) and S(X)) are in one file (i.e., second file 102). However, such an organization may not be deployable. For example, the second file 102 may not be deployed or executed before the procedure X is deployed or executed from the first file 100. For example, in order for the second file to be executed, S(X) of the second file 102 may require a result of procedure X from the first file 100. As such, the first file 100 must be executed prior to the second file 102. Thus, a cyclical dependency exists between the first file 100 and the second file 102.

Figure 2:
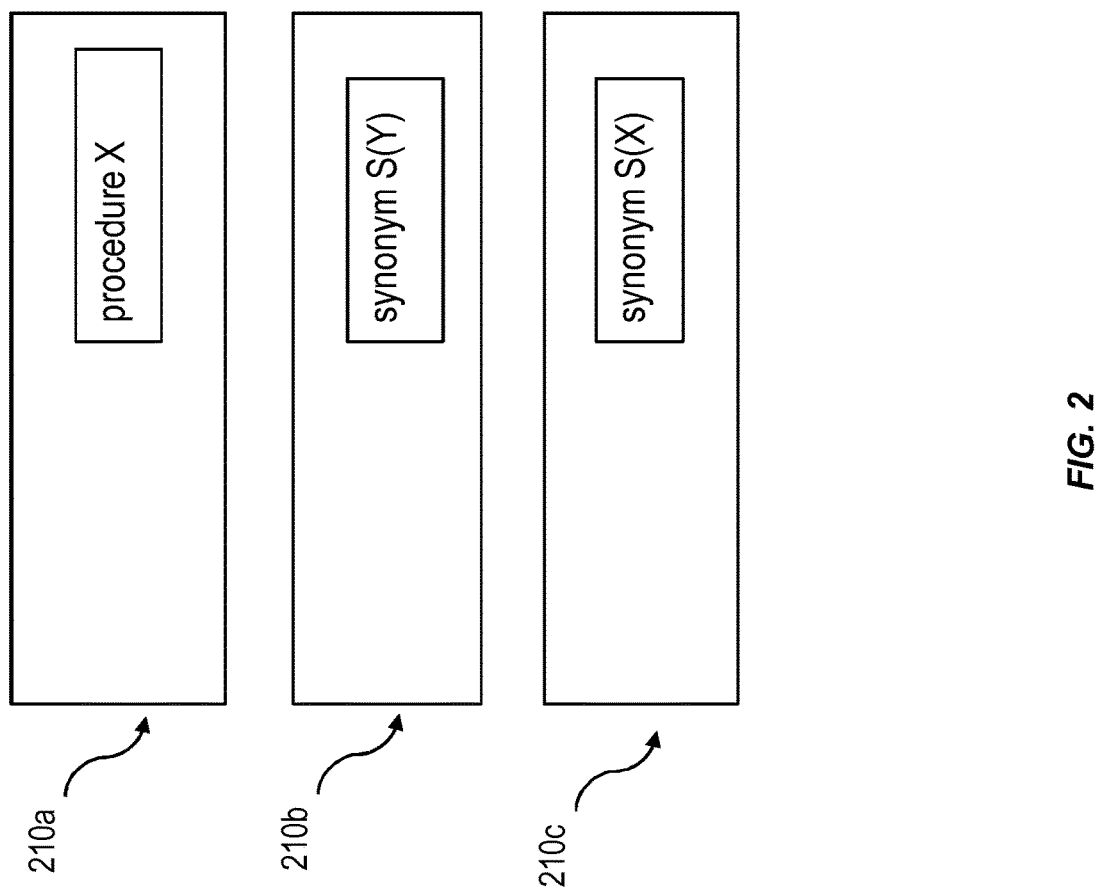
FIG. 2 shows a diagram illustrating the first file and the second file of FIG. 1 transparently split into subunits.

FIG. 2 illustrates an example of the first file 100 and the second file 102 from FIG. 1 transparently split into subunits 210a, 210b and 210c. Such subunits can provide a user with a higher degree of freedom with regards to organizing source files, while still enabling valid deployment scenarios and preventing cyclic dependencies, as discussed above. For example, the subunits 210a, 210b, and 210c can be reordered based on their dependencies after being split out from larger parameter files. As such, a first subunit (e.g., subunit 210a having procedure X) is not executed before another submit (e.g., subunit 210b having synonym S(Y)) from which the first subunit depends on, and so forth. Metadata can be assigned to each of the subunits 210a, 210b, and 210c for linking each of the subunits back to their original parameter file (e.g., first file 100 or second file 102). In addition, in some implementations, the transparent splitting can be completed in a calculation engine of a database system.

Figure 3:
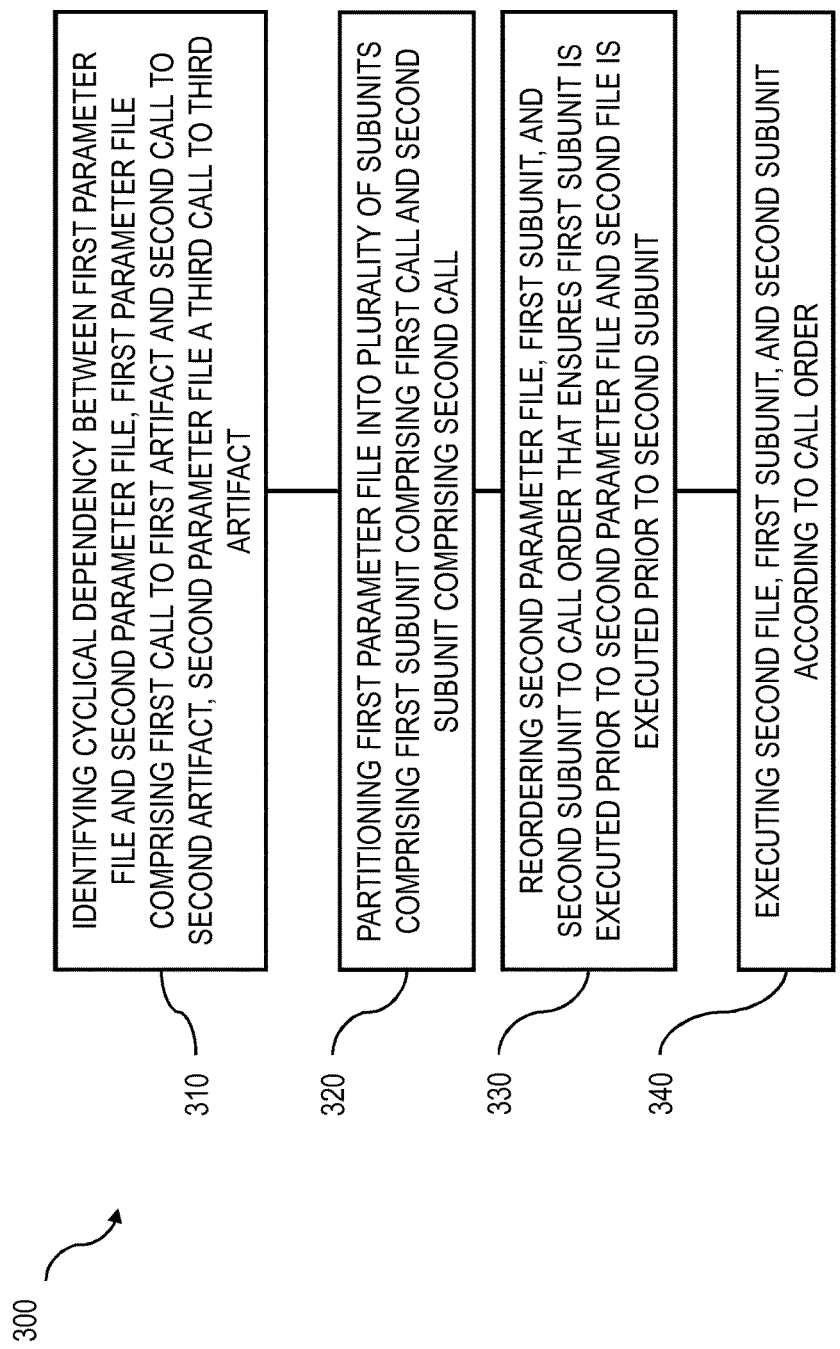
FIG. 3 shows a process flow diagram illustrating aspects of a method having one or more features consistent with implementations of the current subject matter.

FIG. 3 shows a process flow chart 500 illustrating features of a method consistent with one or more implementations of the current subject matter. It will be understood that other implementations may include or exclude certain features. At 510, a cyclical dependency can be identified between a first parameter file and a second parameter file. The first parameter file can include a first call to a first artifact and a second call to a second artifact, the second parameter file can include a third call to a third artifact. At 520, the first parameter file can be partitioned into a plurality of subunits comprising a first subunit including the first call and a second subunit including the second call. At 530, the second parameter file, the first subunit, and the second subunit can be reordered to a call order that ensures the first subunit is executed prior to the second parameter file and the second file is executed prior to the second subunit. At 540, the second file, the first subunit, and the second subunit can be executed according to the call order.

Figure 4:
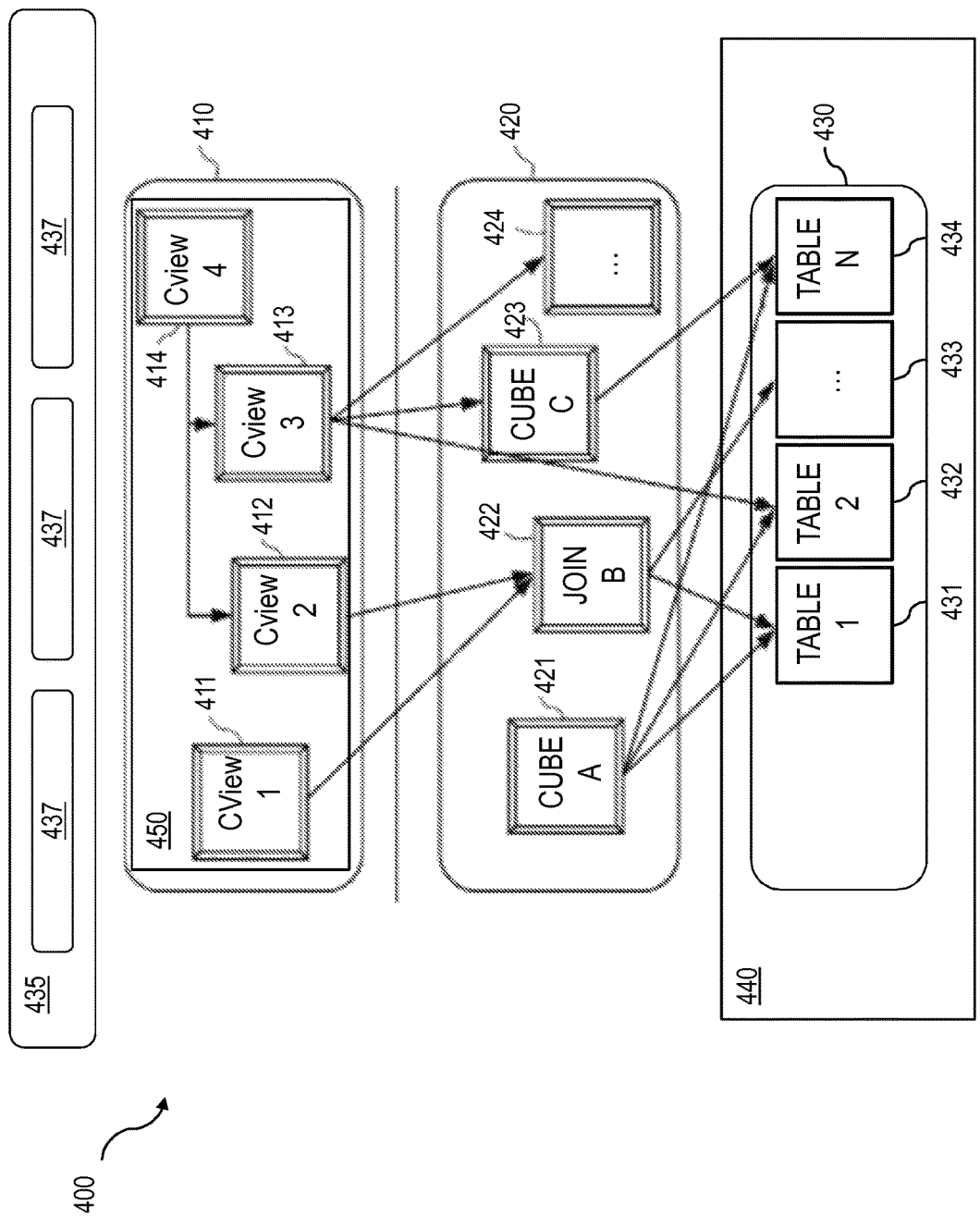
FIG. 4 shows a diagram illustrating a computing architecture including a database system that includes three layers: a calculation engine layer, a logical layer, and a physical table-pool.

FIG. 4 is a diagram that illustrates a computing architecture 400 including a database system that includes three layers: a calculation engine layer 410, a logical layer 420, and a physical table-pool 430. One or more application servers 435 implementing database client applications 437 can access the database system 400. Calculation scenarios can be executed by a calculation engine, which can form part of a database or which can be part of the calculation engine layer 410 (which is associated with the database). The calculation engine layer 410 can be based on and/or interact with the other two layers, the logical layer 420 and the physical table pool 430. The basis of the physical table pool 430 consists of physical tables (called indexes) containing the data, which can be stored on one more database servers 440. Various tables 431-434 can be joined using logical metamodels 421-424 defined by the logical layer 420 to form an index. For example, the tables 431-434 in a cube (e.g. an online analytical processing or "OLAP" index) can be assigned roles (e.g., fact or dimension tables) and joined to form a star schema. It is also possible to form join indexes (e.g. join index B 422 in FIG. 4), which can act like database views in computing environments such as the Fast Search Infrastructure (FSI) available from SAP SE of Walldorf, Germany.

As stated above, a calculation scenario 450 can include individual nodes (e.g. calculation nodes) 411-414, which in turn each define operations such as joining various physical or logical indexes and other calculation nodes (e.g., CView 4 is a join of CView 2 and CView 3). That is, the input for a node 411-414 can be one or more physical, join, or OLAP indexes or calculation nodes.

In a calculation scenario 450, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 450 can be created which can be reused by multiple queries even if such queries do not require every attribute specified by the calculation scenario 450.

Every calculation scenario 450 can be uniquely identifiable by a name (e.g., the calculation scenario 450 can be a database object with a unique identifier, etc.). Accordingly, the calculation scenario 450 can be queried in a manner similar to a view in a SQL database. Thus, the query is forwarded to the calculation node 411-414 for the calculation scenario 450 that is marked as the corresponding default node. In addition, a query can be executed on a particular calculation node 411-414 (as specified in the query). Furthermore, nested calculation scenarios can be generated in which one calculation scenario 450 is used as source in another calculation scenario (e.g. via a calculation node 411-414 in this calculation scenario 450). Each calculation node 411-414 can have one or more output tables. One output table can be consumed by several calculation nodes 411-414.

Figure 5:
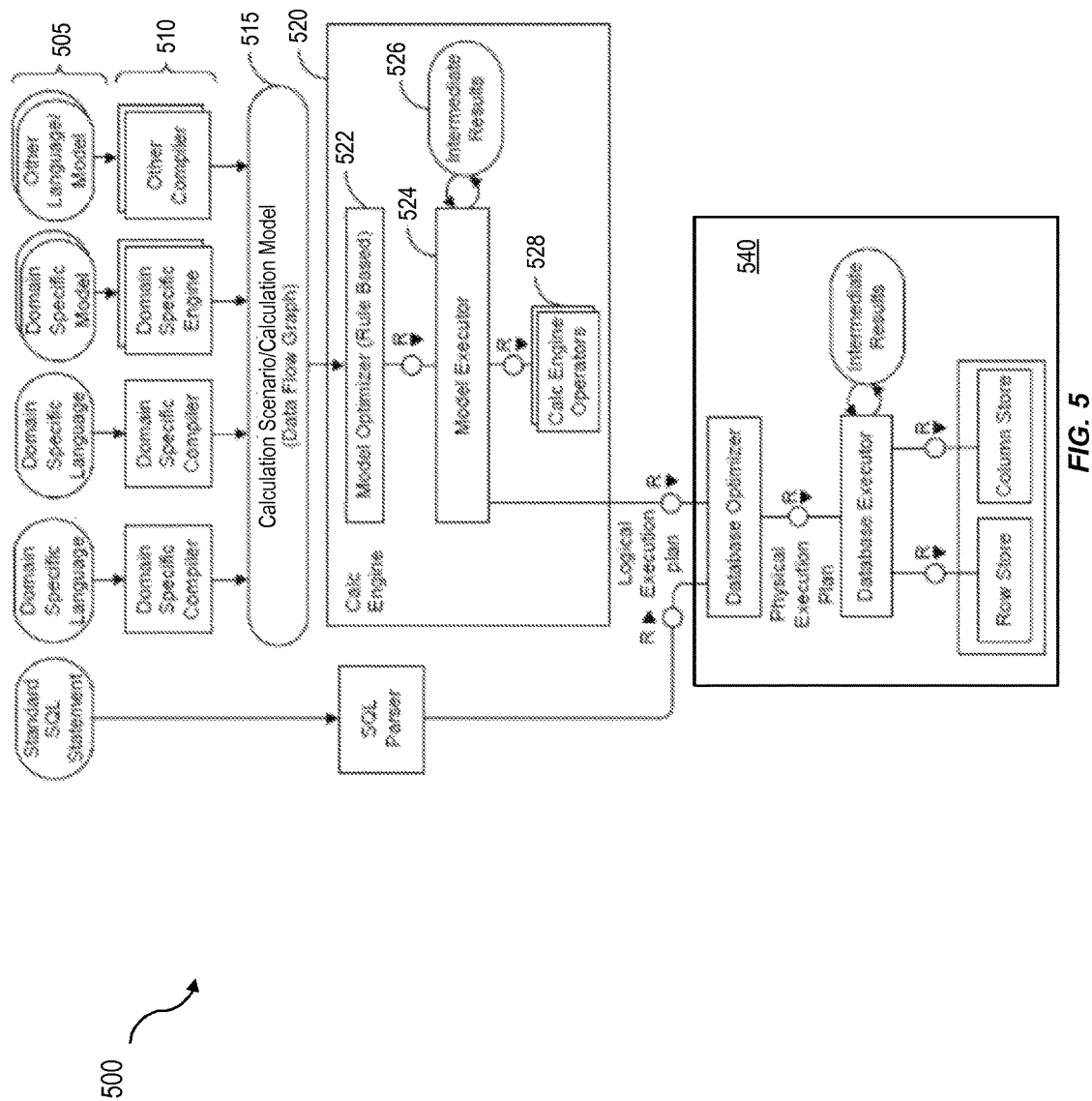
FIG. 5 shows a diagram illustrating a sample architecture for request processing and execution control.

FIG. 5 is a diagram 500 illustrating a sample architecture for request processing and execution control. As shown in FIG. 5, artifacts 505 in different domain specific languages can be translated by their specific compilers 510 into a common representation called a "calculation scenario" 515 (which is also referred to in in FIG. 5 as a calculation model). To achieve enhanced performance, the models and programs written in these languages are executed inside the database server 440. This arrangement eliminates the need to transfer large amounts of data between the database server 440 and a client application 437, which can be executed by an application server 435. Once the different artifacts 505 are compiled into this calculation scenario 515, they can be processed and executed in the same manner. A calculation engine 520 executes the calculation scenarios 515.

A calculation scenario 515 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 337 at the application server 335). Inputs can be connected to tables or to the outputs of other nodes. A calculation scenario 515 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 515 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 515 can be defined as part of database metadata and invoked multiple times. A calculation scenario 515 can be created, for example, by a SQL statement "CREATE CALCULATION SCENARIO <NAME> USING <XML or JSON>". Once a calculation scenario 515 is created, it can be queried (e.g., "SELECT A, B, C FROM <scenario name>", etc.). In some cases, databases can have pre-defined calculation scenarios 515 (default, previously defined by users, etc.). Calculation scenarios 515 can be persisted in a repository (coupled to the database server 340) or in transient scenarios. Calculation scenarios 515 can also be kept in-memory.

Calculation scenarios 515 are more powerful than traditional SQL queries or SQL views for many reasons. One reason is the possibility to define parameterized calculation schemas that are specialized when the actual query is issued. Unlike a SQL view, a calculation scenario 515 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 515 may contain an aggregation node containing all attributes. Later, the attributes for grouping can be supplied with the query. This allows having a predefined generic aggregation, with the actual aggregation dimensions supplied at invocation time. The calculation engine 520 can use the actual parameters, attribute list, grouping attributes, and the like supplied with the invocation to instantiate a query specific calculation scenario 515. This instantiated calculation scenario 515 is optimized for the actual query and does not contain attributes, nodes or data flows that are not needed for the specific invocation.

When the calculation engine 520 gets a request to execute a calculation scenario 515, it can first optimize the calculation scenario 515 using a rule based model optimizer 522. Examples for optimizations performed by the model optimizer can include "pushing down" filters and projections so that intermediate results 526 are narrowed down earlier, or the combination of multiple aggregation and join operations into one node. The optimized model can then be executed by a calculation engine model executor 524 (a similar or the same model executor can be used by the database directly in some cases). This includes decisions about parallel execution of operations in the calculation scenario 515. The model executor 524 can invoke the required operators (using, for example, a calculation engine operators module 528) and manage intermediate results. Most of the operators are executed directly in the calculation engine 520 (e.g., creating the union of several intermediate results). The remaining nodes of the calculation scenario 515 (not implemented in the calculation engine 520) can be transformed by the model executor 524 into a set of logical database execution plans. Multiple set operation nodes can be combined into one logical database execution plan if possible.

The calculation scenarios 515 of the calculation engine 520 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 520 to execute the calculation scenario 515 behind the calculation view. In some implementations, the calculation engine 520 and the SQL processor are calling each other: on one hand the calculation engine 520 invokes the SQL processor for executing set operations and SQL nodes and, on the other hand, the SQL processor invokes the calculation engine 520 when executing SQL queries with calculation views.

The attributes of the incoming datasets utilized by the rules of model optimizer 522 can additionally or alternatively be based on an estimated and/or actual amount of memory consumed by the dataset, a number of rows and/or columns in the dataset, and the number of cell values for the dataset, and the like.

A calculation scenario 515 as described herein can include a type of node referred to herein as a semantic node (or sometimes semantic root node). A database modeler can flag the root node (output) in a graphical calculation view to which the queries of the database applications directed as semantic node. This arrangement allows the calculation engine 520 to easily identify those queries and to thereby provide a proper handling of the query in all cases.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A computer program product comprising a non-transitory computer-readable storage medium storing instructions that, when executed by at least one programmable processor, cause the at least one programmable processor to perform operations comprising:
identifying a cyclical dependency between a first parameter file and a second parameter file, the first parameter file comprising a first call to a first artifact and a second call to a second artifact, the second parameter file comprising a third call to a third artifact;
partitioning the first parameter file into a plurality of subunits comprising a first subunit comprising the first call and a second subunit comprising the second call;
generating a call order of the second parameter file, the first subunit, and the second subunit, wherein the call order ensures the first subunit is executed prior to the second parameter file and the second parameter file is executed prior to the second subunit; and
executing, according to the call order, the second parameter file, the first subunit, and the second subunit.

2. The computer program product of claim 1, further comprising assigning metadata to each of the first subunit and the second subunit, the metadata comprising information that links each of the first subunit and the second subunit to the first parameter file.

3. The computer program product of claim 1, wherein the cyclical dependency comprises a requirement that the first call is executed prior to the third call being executed and that the second call is executed after the third call is executed.

4. The computer program product of claim 1, wherein the operations further comprise maintaining a catalog relation between runtime and design time artifacts to point to the first parameter file and not to the first subunit and/or the second subunit.

5. The computer program product of claim 1, wherein the operations further comprise partitioning the second parameter file into a second plurality of subunits comprising a third subunit comprising the third call and a fourth subunit comprising a fourth call to a fourth artifact that the second parameter file further comprises.

6. A method for implementation by one or more data processors forming part of at least one computing system, the method comprising:
identifying a cyclical dependency between a first parameter file and a second parameter file, the first parameter file comprising a first call to a first artifact and a second call to a second artifact, the second parameter file comprising a third call to a third artifact;
partitioning the first parameter file into a plurality of subunits comprising a first subunit comprising the first call and a second subunit comprising the second call;
generating a call order of the second parameter file, the first subunit, and the second subunit, wherein the call order ensures the first subunit is executed prior to the second parameter file and the second parameter file is executed prior to the second subunit; and
executing, according to the call order, the second parameter file, the first subunit, and the second subunit.

7. The method of claim 6, further comprising assigning metadata to each of the first subunit and the second subunit, the metadata comprising information that links each of the first subunit and the second subunit to the first parameter file.

8. The method of claim 6, wherein the cyclical dependency comprises a requirement that the first call is executed prior to the third call being executed and that the second call is executed after the third call is executed.

9. The method of claim 6, wherein the operations further comprise maintaining a catalog relation between runtime and design time artifacts to point to the first parameter file and not to the first subunit and/or the second subunit.

10. The method of claim 6, wherein the operations further comprise partitioning the second parameter file into a second plurality of subunits comprising a third subunit comprising the third call and a fourth subunit comprising a fourth call to a fourth artifact that the second parameter file further comprises.

11. A system comprising:
computer hardware comprising at least one programmable processor configured to perform operations comprising:
identifying a cyclical dependency between a first parameter file and a second parameter file, the first parameter file comprising a first call to a first artifact and a second call to a second artifact, the second parameter file comprising a third call to a third artifact;

partitioning the first parameter file into a plurality of subunits comprising a first subunit comprising the first call and a second subunit comprising the second call;

generating a call order of the second parameter file, the first subunit, and the second subunit, wherein the call order ensures the first subunit is executed prior to the second parameter file and the second parameter file is executed prior to the second subunit; and executing, according to the call order, the second parameter file, the first subunit, and the second subunit.

12. The system of claim 11, further comprising assigning metadata to each of the first subunit and the second subunit, the metadata comprising information that links each of the first subunit and the second subunit to the first parameter file.

13. The system of claim 11, wherein the cyclical dependency comprises a requirement that the first call is executed prior to the third call being executed and that the second call is executed after the third call is executed.

14. The system of claim 11, wherein the operations further comprise maintaining a catalog relation between runtime and design time artifacts to point to the first parameter file and not to the first subunit and/or the second subunit.

15. The system of claim 11, wherein the operations further comprise partitioning the second parameter file into a second plurality of subunits comprising a third subunit comprising the third call and a fourth subunit comprising a fourth call to a fourth artifact that the second parameter file further comprises.

16. The computer program product of claim 1, wherein the executing the second parameter file, the first subunit, and the second subunit comprises:

generating at least a portion of the first artifact, the second artifact, and/or the third artifact.

17. The method of claim 6, wherein the executing the second parameter file, the first subunit, and the second subunit comprises:

generating at least a portion of the first artifact, the second artifact, and/or the third artifact.

18. The system of claim 11, wherein the executing the second parameter file, the first subunit, and the second subunit comprises:

generating at least a portion of the first artifact, the second artifact, and/or the third artifact.

* * * * *